United States Patent
Fink et al.

(10) Patent No.: US 9,796,283 B2
(45) Date of Patent: Oct. 24, 2017

(54) APPARATUS AND METHOD FOR PRE-CONDITIONING A VEHICLE

(71) Applicants: Hyundai Motor Company, Seoul (KR); Kia Motors Corporation, Seoul (KR); Hyundai America Technical Center, Inc., Superior Township, MI (US)

(72) Inventors: Justin Fink, Superior Township, MI (US); Allan Lewis, Windsor (CA)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 205 days.

(21) Appl. No.: 14/522,134

(22) Filed: Oct. 23, 2014

(65) Prior Publication Data

US 2016/0114781 A1 Apr. 28, 2016

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 11/18* | (2006.01) |
| *B60W 10/26* | (2006.01) |
| *H01F 27/42* | (2006.01) |
| *H01F 37/00* | (2006.01) |
| *H01F 38/00* | (2006.01) |
| *H02J 7/00* | (2006.01) |

(52) U.S. Cl.
CPC ............ *B60L 11/182* (2013.01); *B60W 10/26* (2013.01); *Y02T 10/7005* (2013.01); *Y10S 903/907* (2013.01)

(58) Field of Classification Search
CPC ......... B60W 20/00; B60L 11/182; H02J 7/00; B60H 1/00642
USPC ...................... 701/22, 36; 307/104; 320/109
See application file for complete search history.

(56) References Cited

U.S. PATENT DOCUMENTS

| | | | |
|---|---|---|---|
| 9,233,614 B2 | 1/2016 | Imamura et al. | |
| 2012/0161698 A1* | 6/2012 | Anderson ............ | H02J 7/0077 320/109 |

(Continued)

FOREIGN PATENT DOCUMENTS

| | | |
|---|---|---|
| JP | 2007-269161 A | 10/2007 |
| JP | 2014-117006 A | 6/2014 |

(Continued)

*Primary Examiner* — Mahmoud Ismail
(74) *Attorney, Agent, or Firm* — Mintz Levin Cohn Ferris Glovsky and Popeo, P.C.; Peter F. Corless

(57) ABSTRACT

An apparatus for pre-conditioning a vehicle comprises a battery in the vehicle configured to store and supply electric power; a wireless power receiver configured to wirelessly receive electric power from an external power supply device; a power controller configured to transfer the electric power received at the wireless power receiver to the battery and to control charging and discharging of the battery; and a pre-conditioner connected to the battery and configured to pre-condition a device which needs to be operated before the vehicle is operated by using off-board energy of the battery.

9 Claims, 6 Drawing Sheets

(56) References Cited

U.S. PATENT DOCUMENTS

2014/0114532 A1* 4/2014 Choi .................... G08G 1/167
                                                          701/36
2015/0042168 A1* 2/2015 Widmer ................ B60L 11/182
                                                          307/104
2015/0217645 A1   8/2015 Imamura et al.

FOREIGN PATENT DOCUMENTS

| KR | 10-2012-0071141 A | 7/2012 |
| KR | 10-2013-0046692   | 10/2012 |
| KR | 10-2012-0113084 A | 5/2013 |

* cited by examiner

APPARATUS AND METHOD FOR PRE-CONDITIONING A VEHICLE

BACKGROUND

Technical Field

The present disclosure relates to an apparatus and method for pre-conditioning a vehicle, and more particularly, to an apparatus and method for pre-conditioning a vehicle system and/or its elements by a device provided in a vehicle using off-board energy which was wirelessly transferred from a battery. The pre-conditioning of a vehicle refers to temperature modification, energy leveling, and the like for optimizing initial conditions of the vehicle and related systems before operation of the vehicle operation.

Description of the Related Art

Interest in electric vehicles is increasing in order to reduce the carbon dioxide emissions in accordance with regulations for environmental pollution all over the world. In addition, by constructing an infrastructure such as the installation of battery recharging stations and the like, a lot of effort has been devoted to the activation of electric vehicles.

As electric vehicles become increasingly popular, fast charging systems which shorten the charging time and thus increase convenience are desired. As such, given the commonly used wired charging systems which require plugging into an electric outlet, a non-contact or wireless charging system capable of eliminating the inconvenience of the wired charging system is highly desirable.

SUMMARY

The object of the present disclosure is to provide an apparatus and method for pre-conditioning a vehicle, which controls the vehicle system and/or its elements, by wirelessly supplying electric power to the parked vehicle and using off-board energy of a battery storing the wirelessly supplied electric power, where pre-conditioning of the vehicle occurs prior to operation (e.g., driving) of the vehicle.

An apparatus for pre-conditioning a vehicle according to an embodiment of the present disclosure comprises a battery in a vehicle configured to store electric power and supply the stored electric power; a wireless power receiver configured to wirelessly receive electric power from an external power supply device; a power controller configured to transfer the electric power received from the wireless power receiver to the battery and to control charging and discharging of the battery; and a pre-conditioner connected to the battery and configured to pre-condition a device which needs to be operated before the vehicle is operated using off-board energy of the battery.

In an embodiment, the apparatus further comprises a use pattern analyzer configured to analyze a use pattern related to operation of the vehicle; and a storage device configured to store the use pattern, where the pre-conditioner automatically pre-conditions the device at a pre-set time earlier than a point in time at which operation of the vehicle is predicted, based on the use pattern.

In an embodiment, the vehicle is any one of a hydrogen fuel cell vehicle (e.g., fuel cell vehicle), a grid-connected electric vehicle, a plug-in hybrid electric vehicle, a battery electric vehicle, and an internal combustion engine vehicle.

A method for pre-conditioning a vehicle according to an embodiment of the present disclosure comprises steps of parking a vehicle; wirelessly supplying electric power to the vehicle; and pre-conditioning a device which is needed to be pre-conditioned before the vehicle is operated, through off-board energy of a battery storing the wirelessly supplied electric power.

In an embodiment, the method further comprises a step of detecting a use pattern related to operation of the vehicle and setting the use pattern to automatically pre-condition the vehicle, which includes a step of automatically pre-conditioning a device at a pre-set time earlier than a point in time at which operation of the vehicle is predicted, based on the use pattern.

In an embodiment, the step of detecting a use pattern related to operation of the vehicle and setting the use pattern to automatically pre-condition the vehicle comprises steps of: operating the vehicle; detecting a date and time which the vehicle is operated; accumulatively storing the detected date and time; detecting the use pattern by applying a pattern identifying algorithm, based on the accumulatively stored date and time; and setting the use pattern for the pre-conditioning.

In an embodiment, the step of automatically pre-conditioning a device comprises steps of: setting a pre-conditioning start time by subtracting a pre-set time from a point in time at which operation of the vehicle is predicted; determining whether the pre-conditioning start time comes or not; automatically starting the pre-conditioning of the device, when the pre-conditioning start time comes as the result of the determining; and maintaining a state of the pre-conditioning during the pre-set time.

In an embodiment, the pre-set time is fixed (e.g., 15 minutes) or variable based on customer settings, ambient conditions, or learned driver behavior.

An apparatus and method for pre-conditioning a vehicle, according to the present disclosure, can control a device (e.g., HVAC, fuel systems, oil system, etc.) requiring pre-conditioning before operation (e.g., driving) of the vehicle, by wirelessly supplying electric power to the parked vehicle and using off-board energy from a battery storing the wirelessly supplied electric power.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EMBODIMENTS

Figure 1:
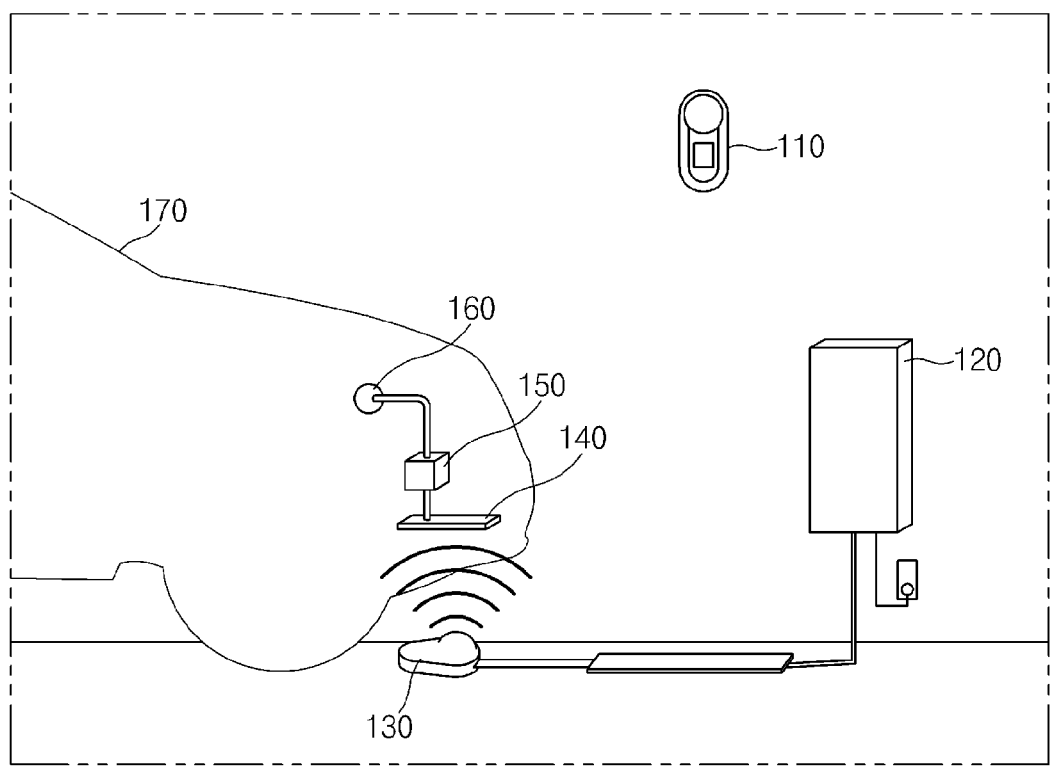
FIG. 1 is a diagram showing wirelessly transferring electric power to a parked vehicle in an apparatus and method for pre-conditioning a vehicle according to an embodiment of the present disclosure.

The advantage and features of the present disclosure and how to achieve it will be explained through embodiments described in detail with the accompanying drawings. However, the disclosure is not limited to embodiments described herein and may be embodied in other aspects. Rather, the disclosed embodiments are provided for explaining to those skilled in the art to which this disclosure pertains to embody the technical spirit of the present disclosure.

In the drawings, embodiments of the present disclosure are not limited to the shown specific aspects and may be exaggerated and/or simplified for clarification or demonstration purposes. Although specific terms are used herein, they are merely used for explaining the present disclosure, and not for limiting the meaning or the scope of the present disclosure as described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. Furthermore, the term "operation" of the vehicle may refer to driving the vehicle, turning on the vehicle, or otherwise operating elements of the vehicle.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

After the vehicle is parked and a certain time has elapsed, when the operation of the vehicle is resumed, various devices provided in the vehicle are not initially at, or near, the optimal condition to achieve peak efficiency upon initial vehicle operation and/or driving. These elements and/or systems require additional energy input during initial operation before peak efficiency is achieved. To improve and/or maximize overall efficiency of the vehicle and its systems during driving, it is required to preliminarily operate and condition various elements and/or systems prior to the driving of the vehicle. For example, the devices required to preliminarily operate may include, for example, an engine cooling water-related device, an engine oil-related device, a transmission oil-related device, a fuel cell, fuel cell stacks, a HVAC system, a charging system, and the like. However, in order to preliminarily operate these devices (hereinafter, referred to "pre-conditioning"), generally, the physical controlling by a vehicle driver is typically required.

However, an apparatus and method for pre-conditioning a vehicle according to the present disclosure does not require the physical controlling by a vehicle driver, because the above devices can be automatically pre-conditioned using the off-board energy of a battery storing electric power that is wirelessly supplied in the state which the vehicle is parked. And, the vehicle described with respect to the present disclosure may be any one of hydrogen fuel cell vehicles (e.g., fuel cell vehicles), grid-connected electric vehicles, plug-in hybrid electric vehicles, battery electric vehicles, internal combustion engine vehicles, and the like.

FIG. 1 is a diagram showing wirelessly transferring electric power to a parked vehicle in an apparatus and method for pre-conditioning a vehicle according to an embodiment of the present disclosure.

First, as an apparatus for wirelessly transmitting electric power, FIG. 1 illustrates a display panel 110, a power control module 120 and a parking pad 130. The display panel 110 notifies the driver of whether the power receiving pad 140 of the vehicle 170 is aligned with the top of the parking pad 130. And, the power control module 120 is connected to the connector (e.g., electric outlet) supplying a constant voltage (for example, 240V), and controls the power transferred to the parking pad 130. The power control pad 130 has a primary coil inside it, and by using this, the power transferred from the power control module 120 is transferred to the power receiving pad 140 which is the external power receiving device.

The vehicle 170 includes a power receiving pad 140, a vehicle electric module 150, and an adaptor 160. Here, the power receiving pad 140 has a secondary coil inside it, is closely aligned with the parking pad 130, and wirelessly receives the power from the parking pad 130. The vehicle electrical module 150 controls the power received from the power receiving pad 140 and distributes it to device inside the vehicle. The adaptor 160 can be connected to the device (e.g., a battery, etc.) which is provided in the vehicle.

Figure 2:
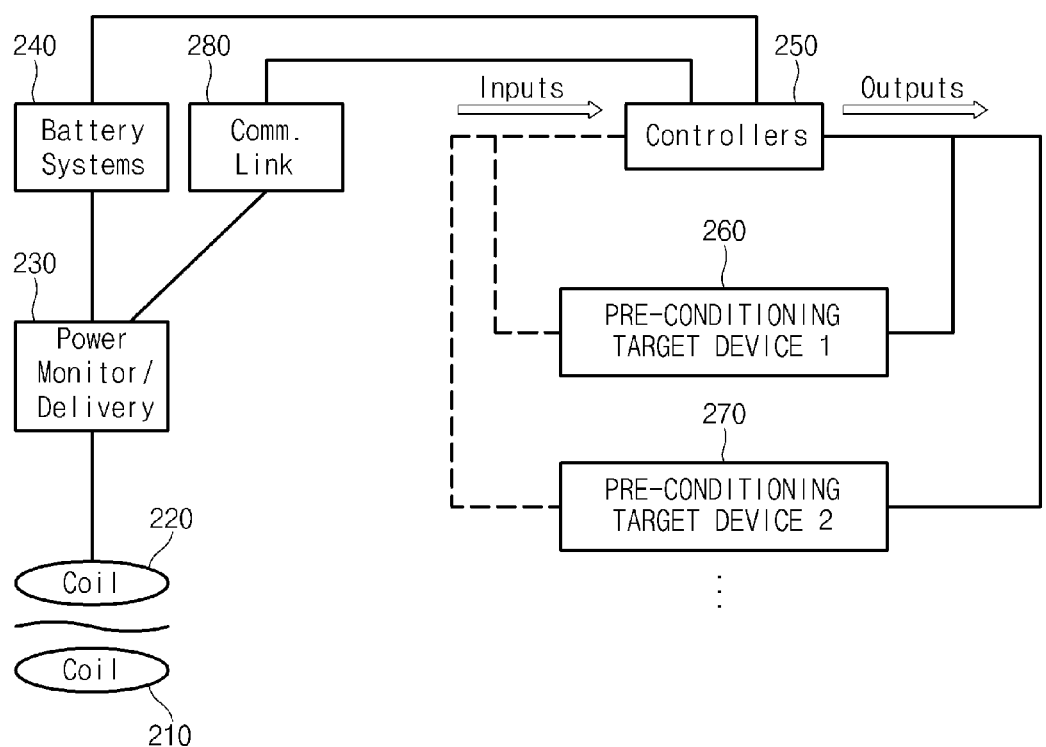
FIG. 2 is a diagram showing an apparatus for pre-conditioning a vehicle according to an embodiment of the present disclosure.

FIG. 2 is a diagram showing an apparatus for pre-conditioning a vehicle according to an embodiment of the present disclosure. Referring to FIG. 2, the vehicle includes a primary coil 210, a secondary coil 220, a power controller (a power monitor/delivery) 230, a battery 240, a pre-conditioner (controllers) 250, pre-conditioning target devices 260, 270 and a communication link 280.

Electric power is wirelessly transferred from the primary coil 210 provided in the outside to the secondary coil 220 provided in the inside of the vehicle. That is, the secondary coil 220 may be the wireless power receiver provided in the vehicle. The power wirelessly transferred to the vehicle is transferred through power controller 230 to the battery 240 provided in the vehicle and is stored (i.e., charged) in the battery 240.

The wireless charging and wireless supplying of electric power to the vehicle is performed in a state which the vehicle is parked. And, in the state which electric power is wirelessly supplied to the parked vehicle, when driving of the vehicle is resumed, the pre-conditioning target devices 260, 270, and other various devices which should be operated before driving of the vehicle, are required to be pre-conditioned.

The pre-conditioner 250 pre-conditions the preconditioning target devices 260, 270 which should be pre-conditioned before driving of the vehicle. Here, the pre-conditioner 250 is connected to the battery and operates the devices using the off-board energy of the battery that stores the wirelessly supplied electric power. Specifically, a control signal is transferred to an actuator provided in the devices. Here, the preconditioning target devices 260, 270 may include an engine cooling water-related device, an engine oil-related device, a transmission oil-related device, HVAC system and the like. If the vehicle is an electric vehicle, a hybrid vehicle, or a hydrogen fuel cell vehicle, the preconditioning target devices 260, 270 may include a battery-related device, a fuel cell-related device, a fuel system, an electrical/energy storage system, and any other vehicle system that could benefit. Also, the pre-conditioner 250 can exchange data with the power controller 230 through a communication link 280, and through this, the off-board energy required for pre-conditioning can be transferred from the battery 240 to the pre-conditioner 250.

The pre-conditioning apparatus according to the present disclosure can further comprise a use pattern analyzer for analyzing a use pattern related to operation (e.g., driving) of the vehicle and a storage device for storing the analyzed use pattern. Based on the use pattern, the pre-conditioning process can be performed. Specifically, with reference to the use pattern stored in the storage device, the pre-conditioner 250 automatically pre-conditions the pre-conditioning target devices 260,270 at a pre-set time that is earlier than a point in time which operation of the vehicle is expected.

Figure 3:
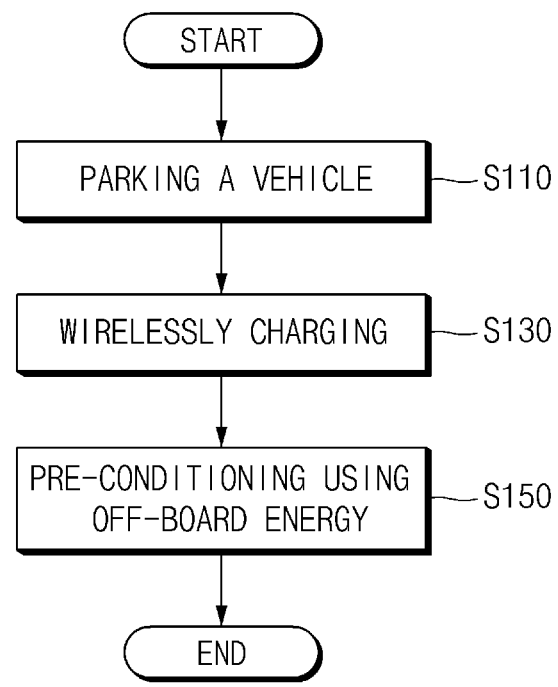
FIG. 3 is a diagram showing a method for pre-conditioning a vehicle according to an embodiment of the present disclosure.

FIG. 3 is a diagram showing a method for pre-conditioning a vehicle according to an embodiment of the present disclosure. Referring to FIG. 3, the method for pre-conditioning a vehicle includes step S110 to step S150.

First, driving of the vehicle is stopped and parked (S110). Here, as shown in FIG. 1, the vehicle is aligned with the apparatus capable of wirelessly transmitting electric power and parked. Then, electric power is wirelessly supplied to the parked vehicle (S130). By using the magnetic induction, magnetic resonance, or the like, electric power is supplied to the parked vehicle, and the supplied power is stored in the battery provided in the vehicle.

After electric power is wirelessly supplied to the vehicle and a certain time is elapsed, the device, which should be pre-operated before the point in time which operation of the vehicle is restarted, is pre-conditioned (S150). Here, the pre-conditioning is automatically performed using the off-board energy of the battery that stores the wirelessly supplied electric power. As a result, since the method for pre-conditioning a vehicle according to the present disclosure uses the off-board energy of the battery storing the wireless transferred electric power, it is energy efficient, and any additional operation of the driver for pre-conditioning is not required.

Figure 4:
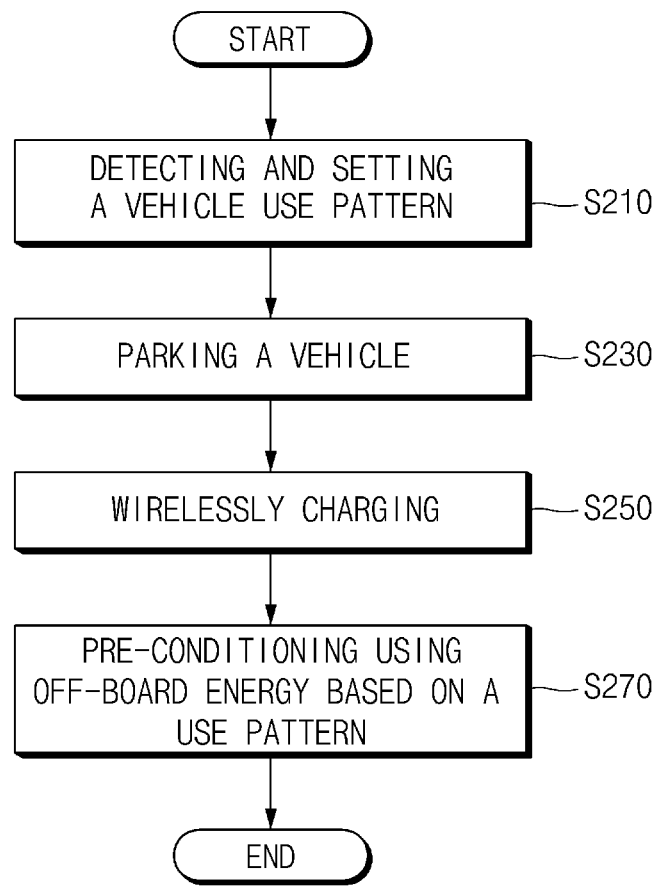
FIG. 4 is a diagram showing a method for pre-conditioning a vehicle according to an embodiment of the present disclosure.

FIG. 4 is a diagram showing a method for pre-conditioning a vehicle according to another embodiment of the present disclosure. Referring to FIG. 4, the method for pre-conditioning a vehicle includes step S210 to step S270.

First, the vehicle use pattern, which indicates a pattern of use (e.g., operation) of the vehicle, is detected, and the detected use pattern is set so that it can be used to pre-condition the vehicle (S210). Specifically, the process of detecting the use pattern will be described below with reference to FIG. 5. Thereafter, the vehicle is parked (S230), and electric power is wirelessly supplied to the vehicle (S250). After electric power is wirelessly supplied to the vehicle (S250) and a certain time is elapsed, the device, which should be pre-operated before the point in time which operation of the vehicle is restarted, is pre-conditioned (S270).

Here, based on the use pattern detected in step S210, the devices of the vehicle predict the point in time which the vehicle would be operated (e.g., driven) in advance, and the device is automatically pre-conditioned at a point in time earlier than the predicted operation point. Similarly, the pre-conditioning of step S270 is also automatically performed using the off-board energy of the battery provided in the vehicle.

Figure 5:
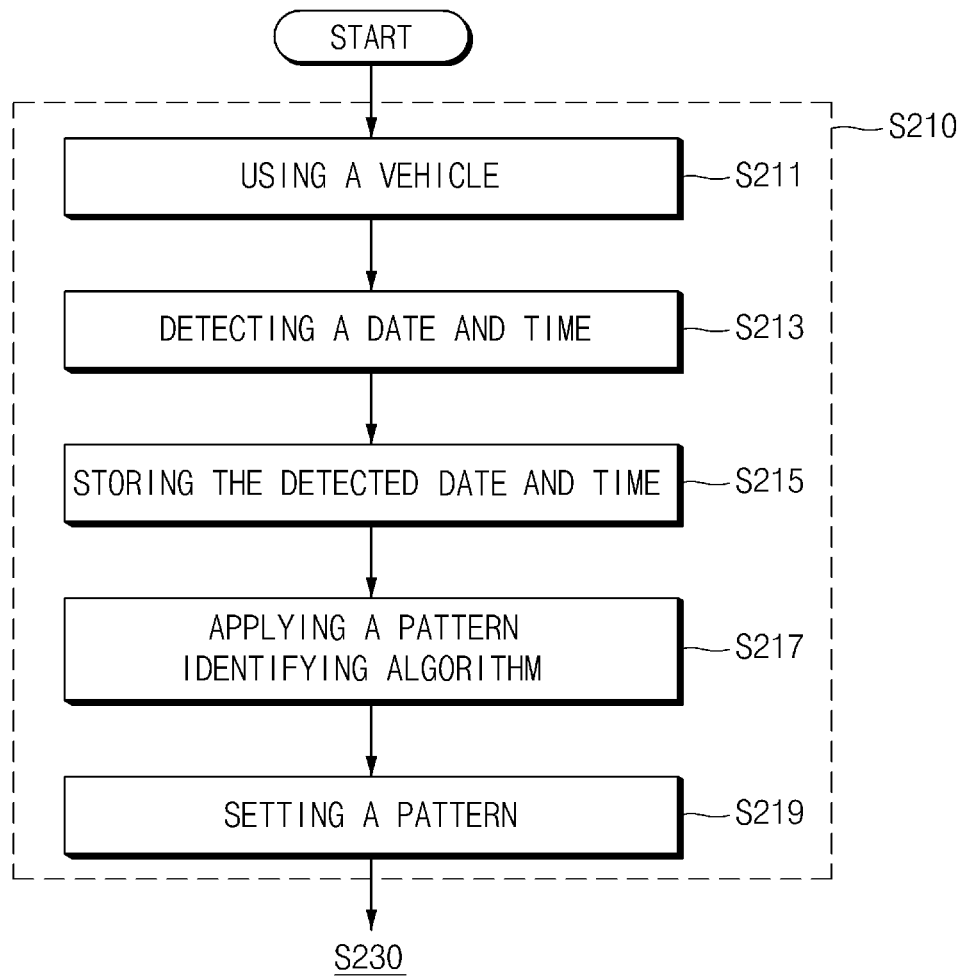
FIG. 5 is a diagram showing detecting and setting a vehicle use pattern in a method for pre-conditioning a vehicle according to an embodiment of the present disclosure.

FIG. 5 is a diagram showing detecting and setting a vehicle use pattern in a method for pre-conditioning a vehicle according to another embodiment of the present invention. Referring to FIG. 5, the process of detecting and setting the vehicle use pattern includes step S211 to step S219.

First, if the vehicle is driven (S211), the date and time which the vehicle is driven are detected (S213). The detected date and time is accumulatively stored (S215), and the accumulatively stored date and time data are analyzed and the algorithm identifying a pattern is applied (S217). By applying the pattern identifying algorithm, the use pattern of the vehicle is detected. Then, the detected use pattern is set so that it can be used in step S270 described in FIG. 4 (S219).

Figure 6:
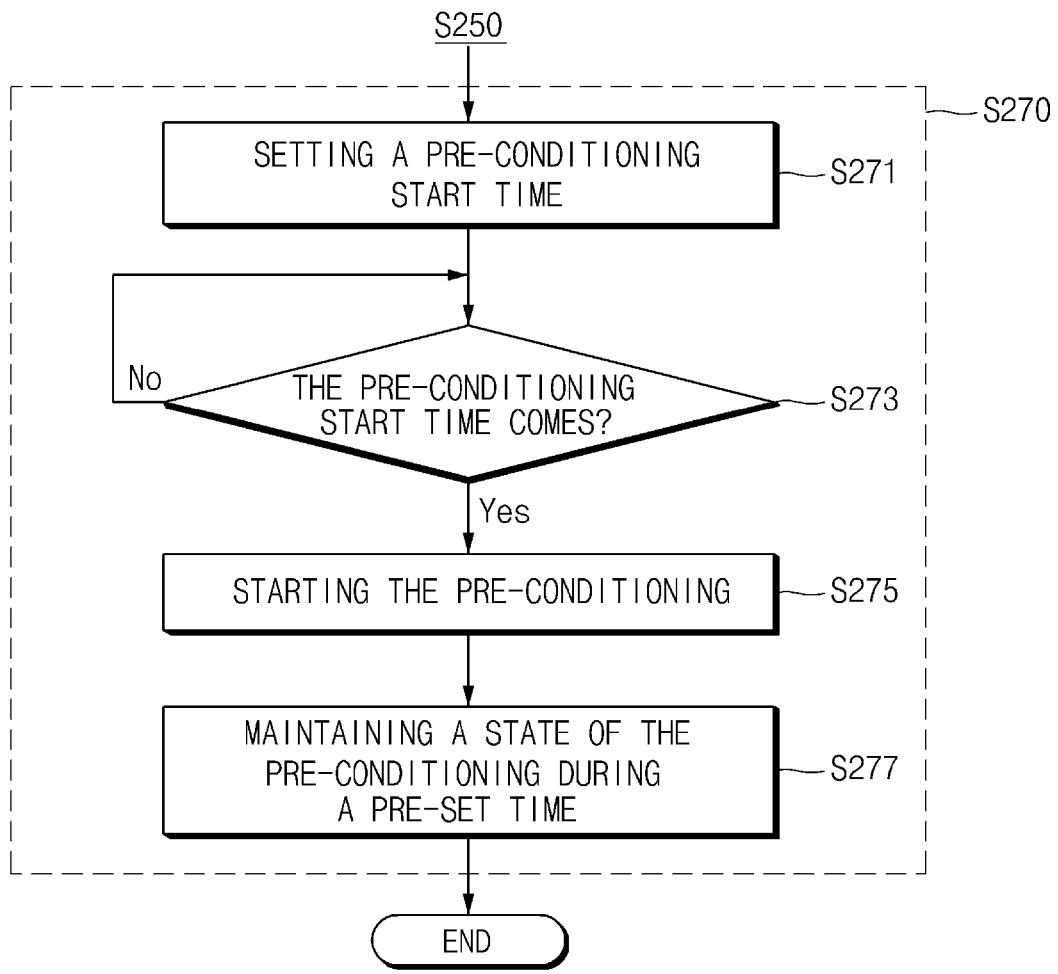
FIG. 6 is a diagram showing pre-conditioning based on a use pattern in a method for pre-conditioning a vehicle according to an embodiment of the present disclosure.

FIG. 6 is a diagram showing pre-conditioning based on a use pattern in a method for pre-conditioning a vehicle according to an embodiment of the present disclosure. Referring to FIG. 6, the process of pre-conditioning various devices based on the use pattern includes step S271 to step S277.

First, based on the pattern which is detected in step S210 and set to use for pre-conditioning, the point in time at which operation (e.g., driving) of the parked vehicle is expected, is predicted. By obtaining the difference between the expected point in time and the pre-set time, the time which the pre-conditioning will be started is set (S271). Here, the pre-set time can be freely adjusted by the driver of the vehicle, and/or it may have a fixed initial pre-set time (e.g., 15 minutes), as a default.

Thereafter, while the vehicle is parked and electric power is wirelessly supplied, it is determined that the pre-set start time set in step S271 has elapsed (S273). On the other hand, if the pre-set start time does not transpire, electric power is continuously supplied in the parked state before auto-shutoff time, and/or an automated message is sent to the driver to confirm continued charge or shutoff.

If the pre-set start time does transpire, the pre-conditioning for various devices which are needed to be operated before the vehicle is driven is automatically started (S275). And, based on the amount of time subtracted from the time which the driving of the vehicle is predicted in step S271, the pre-conditioning started in step S275 is continuously performed during the pre-set time (S277).

Through the processes described in FIG. 4 to FIG. 6, the method for pre-conditioning a vehicle according to the present disclosure can enable the driver to drive the vehicle, depending on the driving schedule of the vehicle, without any action for pre-conditioning various devices before driving the vehicle, because pre-conditioning is automatically performed using the off-board energy of the battery that stores the wirelessly transferred power before the time which the driving of the vehicle is predicted with reference to the vehicle's use pattern. As a result, the apparatus and method for pre-conditioning a vehicle can enable the driver of the vehicle to drive the vehicle without any action for pre-conditioning the devices before driving the vehicle. Because various devices needed to be operated before the predicted operation time of the vehicle are automatically pre-conditioned using the off-board energy of the battery, the energy efficiency of the vehicle and the associated charging system can be increased.

In the above description, the disclosed embodiments have been described through specific examples, but it may be well understood that various modifications can be made without departing from the scope of the present disclosure. Therefore, the scope of the present disclosure is not limited to the above described embodiments, and it should be defined by the appended claims and their equivalents. When taking the foregoing description into account, if the modifications and variations of the disclosed embodiments fall within the following claims and their equivalents, then it is construed that the present disclosure includes these modifications and variations.

What is claimed is:

1. An apparatus for pre-conditioning a vehicle, vehicle systems and its elements, the apparatus comprising:
   a battery in the vehicle configured to store electric power and supply the stored electric power;
   a wireless power receiver configured to wirelessly receive electric power from an external power supply device;
   a power controller configured to transfer the electric power received at the wireless power receiver to the battery and to control charging and discharging of the battery; and
   a pre-conditioner connected to the battery and configured to pre-condition a device which needs to be operated before the vehicle is operated using off-board energy of the battery, wherein
   the pre-conditioner automatically pre-conditions the device at a pre-set time earlier than a point in time at which operation of the vehicle is predicted based on a vehicle use pattern related to the operation of the vehicle,
   the pre-conditioner is further configured to exchange data with the power controller through a communication link, and
   off-board energy required for pre-conditioning the device is transferred from the battery to the pre-conditioner according to the data exchanged by the pre-conditioner with the power controller.

2. The apparatus for pre-conditioning the vehicle, vehicle systems and its elements according to claim 1, wherein the vehicle is any one of a hydrogen fuel cell vehicle, a grid-connected electric vehicle, a plug-in hybrid electric vehicle, a battery electric vehicle, and an internal combustion engine vehicle.

3. The apparatus for pre-conditioning the vehicle, vehicle systems and its elements according to claim 1, wherein the device which needs to be operated before the vehicle is driven includes any one of a fuel system, HVAC system, electrical/energy system, an engine cooling water related device, an engine oil-related device, and a transmission oil-related device.

4. A method for pre-conditioning a vehicle, vehicle systems and its elements, the method comprising steps of:
   parking the vehicle;
   wirelessly supplying, by a power controller, electric power to the vehicle;
   exchanging, by a pre-conditioner, data with the power controller through a communication link; and
   pre-conditioning, by the pre-conditioner, a device which is needed to be operated before the vehicle is operated, through off-board energy of a battery storing the wirelessly supplied electric power, wherein
   the pre-conditioning of the device includes automatically pre-conditioning the device at a pre-set time earlier than a point in time at which operation of the vehicle is predicted based on a vehicle use pattern related to the operation of the vehicle, and
   off-board energy required for pre-conditioning the device is transferred from the battery to the pre-conditioner according to the data exchanged by the pre-conditioner with the power controller.

5. The method for pre-conditioning the vehicle, vehicle systems and its elements according to claim 4, wherein detecting of the vehicle use pattern related to operation of the vehicle and setting of the vehicle use pattern to automatically pre-condition the device comprises steps of:
   operating the vehicle;
   detecting a date and time at which the vehicle is operated;
   accumulatively storing the detected date and time;
   detecting the vehicle use pattern by applying a pattern identifying algorithm,
   based on the accumulatively stored date and time; and
   setting the vehicle use pattern for the pre-conditioning.

6. The method for pre-conditioning the vehicle, vehicle systems and its elements according to claim 4, wherein the automatically pre-conditioning of the device comprises steps of:
   setting a pre-conditioning start time subtracting a pre-set time from a point in time at which operation of the vehicle is predicted;
   determining whether the pre-conditioning start time occurs or not;
   automatically starting the pre-conditioning of the device, when it is determined that the pre-conditioning start time occurs; and
   maintaining a state of the pre-conditioning during the pre-set time.

7. The method for pre-conditioning the vehicle, vehicle systems and its elements according to claim 6, wherein the pre-set time is fixed, freely adjustable by a vehicle operator, or variable based on local conditions.

8. The method for pre-conditioning the vehicle, vehicle systems and its elements according to claim 4, wherein the vehicle is any one of a hydrogen fuel cell vehicle, a grid-connected electric vehicle, a plug-in hybrid electric vehicle, a battery electric vehicle, and an internal combustion engine vehicle.

9. The method for pre-conditioning the vehicle, vehicle systems and its elements according to claim 4, wherein the device which is needed to be pre-operated before the vehicle is driven includes any one of a fuel system, HVAC system, electrical/energy system, an engine cooling water related device, an engine oil related device, and a transmission oil related device.

* * * * *